United States Patent [19]

Van de Walle

[11] Patent Number: 4,996,065

[45] Date of Patent: Feb. 26, 1991

[54] MOLASSES-FREE CHEMICALLY REACTIVE BINDER FOR ANIMAL FEED

[75] Inventor: Richard H. Van de Walle, Columbia, Md.

[73] Assignee: Martin Marietta Magnesia Specialties Inc., Hunt Valley, Md.

[21] Appl. No.: 554,950

[22] Filed: Jul. 16, 1990

Related U.S. Application Data

[63] Continuation of Ser. No. 300,106, Jan. 19, 1989, abandoned, which is a continuation-in-part of Ser. No. 819,323, Jan. 16, 1986, abandoned.

[51] Int. Cl.$^5$ ................................................ A23K 1/00
[52] U.S. Cl. .................................... 426/72; 426/74; 426/454; 426/512; 426/623; 426/630; 426/636; 426/646; 426/658; 426/807
[58] Field of Search .................. 426/72, 74, 454, 512, 426/623, 630, 636, 646, 807

[56] References Cited

U.S. PATENT DOCUMENTS

| | | | |
|---|---|---|---|
| 3,246,336 | 4/1966 | Baribo et al. | 426/658 |
| 3,476,565 | 11/1969 | Anderson et al. | 426/807 |
| 3,532,503 | 10/1970 | Kviesitis | 426/658 |
| 3,657,423 | 4/1972 | Yacowitz | 426/807 |
| 4,027,043 | 5/1977 | Schroeder et al. | 426/69 |
| 4,075,325 | 2/1978 | Kauzel | 424/140 |
| 4,160,041 | 7/1979 | Schroeder et al. | 426/807 |
| 4,171,385 | 10/1979 | Skoch et al. | 426/74 |
| 4,182,755 | 1/1980 | McNeff | 424/147 |
| 4,221,818 | 9/1980 | Schroeder | 426/658 |
| 4,431,675 | 2/1984 | Schroeder et al. | 426/74 |
| 4,560,561 | 12/1985 | Henderson | 426/74 |

FOREIGN PATENT DOCUMENTS

| | | |
|---|---|---|
| 0064072 | 5/1982 | European Pat. Off. |
| 2047066 | 11/1980 | United Kingdom |
| 2063255 | 6/1981 | United Kingdom |

OTHER PUBLICATIONS

"The Steffen Process," *Beet-Sugar Technology*, 3rd Edition, R. A. McGinnis, ed., pp. 595–616, Beet Sugar Development Foundation, 1987.

*Primary Examiner*—R. B. Penland
*Attorney, Agent, or Firm*—Herbert W. Mylius; Alan G. Towner; James B. Eisel

[57] ABSTRACT

The present invention relates to a novel binder combination for pelletized and compressed animal feed. This binder comprises a chemically reactive, molasses-free, mixture of a reactive phosphate source plus a reactive metal oxide, hydroxide, or salt.

10 Claims, No Drawings

MOLASSES-FREE CHEMICALLY REACTIVE BINDER FOR ANIMAL FEED

This application is a continuation of application Ser. No. 07/300,106, filed Jan. 19, 1989 now abandoned, which is this application is a Continuation-In-Part of application serial number 06/819,323 filed Jan. 16, 1986, now abandoned.

BACKGROUND OF THE INVENTION

The present invention relates to a novel binder composition for pelletized and compressed animal feed. This binder comprises a molasses-free chemically reactive mixture of a reactive phosphate source plus a reactive metal oxide, hydroxide, or salt. This binder is effective in pelletizing dry animal feed ingredients containing less than about 5 percent by weight molasses.

In recent years, pelleted animal feed has become a dominant factor in feeding of both monogastric and ruminent animals Pelleted feeds are also useful in the aquaculture industry, including the feeding of finned fish and crustaceans. There are several advantages to feeding pelleted feeds: (1) pelleted feed prevents selective feeding on those ingredients in the formulation which are more palatable and thus more desirable to the animal; (2) pelleting of the feed ration prevents segregation of the varying size and density constituents which are inherent in animal feeds; (3) pelleting animal feed results in higher bulk density, which is advantageous for both shipping and handling, resulting in maximum load efficiency and reduced storage requirements; (4) pelleting also increases nutritional utilization of the feed components, thus increasing conversion rate of the feed formulation.

Feed pelleting is, as commonly practiced, an extrusion type thermoplastic molding operation in which finely divided particles of a feed ration are formed into compact, easily handled pellets To improve the strength and durability, and to reduce fines produced during the pelleting process, several feed binder additives have been recommended. One of the commonly used ingredients for such purpose is molasses However, this product tends to undesirably reduce lubrication of the feed ingredients through the die of the pelleting equipment, resulting in decreased production rates and increased energy costs. Accordingly, the presence of molasses may be considered undesirable in feed compositions to be subjected to pelleting.

An example of a feed supplement in block form is set forth in U.S. Pat. No. 4,027,043, of Schroeder et al. This patent teaches an animal feed supplement which contains a major proportion of molasses (45 to 93 weight percent) and solidifying components consisting of a phosphate or phosphoric acid and a metal salt or oxide in sufficient quantities and proportions to solidify the product. The compositions are prepared by dispersing the solid ingredients into the liquids, and heating to a temperature of about 95° F. The mixture thickens after about 30 minutes, and is pumped into suitable packaging containers for solidification, shipping, and storage. It is to be noted that Schroeder et al do not teach pelletizing or compression of their feed compositions, and that such compositions are very high in molasses content. While the patent theorizes that a metathesis reaction occurs between soluble phosphates and metal additives, it is equally possible that the mechanism of the Schroeder et al "solidification" is merely a variant of the Steffen Process, as set forth in *Beet-Sugar Technology*, 3rd Edition, R.A. McGinnis ed., pp. 595-616, Beet Sugar Development Foundation, 1982. In the Steffen Process, sucrose is recovered from beet molasses by reacting with calcium oxide to form an insoluble product, filtering out the sucrose-containing precipitate, decomposing the precipitate by carbonation, and filtering off the alkaline-earth carbonate to leave relatively pure sucrose in solution. The precipitation step of this process is widely believed to be a surface (adsorption) phenomenon (see pp. 605-607). The method of Schroeder et al involves heating the mixture of feed ingredients and solidifications additives to about 90-100° F., with solidification starting after about 30 minutes and continuing during cooling for at least 8 to 10 hours. Such time frames are more consistent with a surface phenomenon precipitation such as in the Steffen Process than with a metathesis (double decomposition) reaction as theorized. In any event, the Schroeder et al reference teaches a solidification of a high molasses content liquid phase material, requiring the elimination or binding of water. The high molasses content of Schroeder et al would preclude pelletizing.

Another reference teaching the preparation of an animal feed block is U.S. Pat. No. 3,532,503, of Kviesitis. This reference indicates that dry feed components may be mixed with liquid molasses, dried, mixed with minor ingredients, treated with surface active emulsion, and treated with steam to activate the adhesive properties of the molasses, and formed into blocks by compression. Kviesitis clearly relies upon molasses as the binder of his feed composition, and desires a high concentration thereof, as evidenced by his adding further molasses as a liquid binder. As in Schroeder et al, the binding mechanism of Kviesitis requires the involvement of molasses.

Additional materials which have been recommended and used as binders, or binding agents, for pelleting animal feeds include clays, in particular bentonite clay and attapulgite clay; lignin sulfonates, a by-product of the paper pulping industry; and gums, such as natural cellulose gum combinations. In addition, such products as sodium carboxymethylcellulose have been used to increase pellet quality.

The clays and lignin sulfonate products are normally employed as binding agents at rates of from 1.5 percent to 3.5 percent by weight. Nutrient value of such products, however, particularly the clays, is minimal, so considerable volume is used in the formulation with little or no contribution to nutritional value. Gums are normally used at much lower concentrations; in the range of 0.05 percent to 0.2 percent, by weight. However, the cost of such materials often precludes their use, particularly at higher, more effective concentrations.

SUMMARY OF THE INVENTION

The present invention is a novel chemically reactive feed binder composition which exhibits superior bonding strength, and improves pellet quality in a wide variety of feed pelleting formulations, which at the same time provides nutrient value in the animal feed formulations. Recycle fines normally produced during pelleting are also significantly reduced.

A binder of this type will perform equally well when the feed materials are extruded through a feed pelletizer, or when mechanically densified to form feed blocks and briquettes.

It is thus an object of the present invention to provide a reactive binder composition for the pelletizing of animal feed compositions. It is also an object of this invention to provide a binder composition for dry animal feed formulations having minimal or low molasses content.

It is a further object of this invention to provide a molasses-free binder for dry animal feed compositions, which binder is non-reactive with said animal feed composition. It is a still further object of this invention to provide a chemically reactive binder composition which is effective in pelletizing animal feed compositions which have less than about 5 percent molasses present for palatability purposes.

While a common method for pelleting of animal feed is described below, it is understood that this invention also applies to other methods of mechanically pressing or extruding feed materials.

DESCRIPTION OF PREFERRED EMBODIMENTS

The novel chemically reactive feed binder composition of this invention is composed of a reactive phosphate source, such as phosphoric acid, ammonium polyphosphate, monoammonium phosphate, diammonium phosphate, monopotassium phosphate, dipotassium phosphate, monosodium phosphate, monocalcium phosphate, disodium phosphate, or combinations of the above, or other reactive phosphate materials suitable for animal feeds; plus a reactive metal source. No further binding agents, such as molasses, clays, or lignin sulfonates, are necessary. The reactive metal source may be a reactive metal oxide, such as magnesium oxide, aluminum oxide, potassium oxide, calcium oxide and magnesium calcium oxide (dolime); or an hydroxide, such as magnesium hydroxide, aluminum hydroxide, potassium hydroxide, and calcium hydroxide; or a metal salt capable of reacting with a reactive phosphate, hereafter called "reactive metal salt", such as calcium sulfate, magnesium potassium sulfate, magnesium sulfate, potassium sulfate, calcium chloride, magnesium chloride, calcium carbonate and magnesium carbonate; or combinations of such reactive salts, oxides, and hydroxides.

Several factors concerning the phosphate source are important in utilizing the material as one component of this chemically reactive feed binder composition. The first such factor is purity of the phosphate material. The material should be an approved feed grade product and be of a purity level that will meet minimal feed grade requirements. Higher purity, such as technical grade or food grade, is also appropriate for such use and usually yields a higher concentration of the phosphate of choice, allowing use at proportionally lower concentrations.

An additional factor important in the proper choice of phosphate material is particle size. Appropriate particle size can range from not greater than minus 16 mesh, U.S. Sieve Scale, and preferably not smaller than minus 325 mesh. The preferred size range is from about 100 mesh to about 325 mesh.

The most reactive phosphate source for this invention is orthophosphoric acid, as it's rate of reaction with the other component of the feed binder is highest. Due to phosphoric acid's corrosive qualities and problems in handling, however, as well as considerations of introduction into the pelleting process, a solid form of reactive phosphate is most desirable.

To this end, monoammonium phosphate offers the desirable reactive qualities and handling characteristics required. In addition, feed grade, technical grade and food grade forms of this material, suitable for animal feeding, are readily available. Although each of the previously listed solid phosphate sources is useful in developing a cohesive bond for animal feed pellets, the monoammonium phosphate represents the most cost efficient material choice, and is a recognized animal feed product.

Monoammonium phosphate can be manufactured by the reaction of purified phosphoric acid with ammonia. The purified acid is obtained from two primary sources. Thermal or furnace acid is manufactured by burning molten white phosphorus in air and condensing the phosphorous pentoxide combustion gases in water. The second source of purified acid is from solvent extraction of phosphoric acid from impurities in wet process phosphoric acid. Wet process phosphoric acid is obtained by acidulation of apatite ore with sulfuric acid. A new process disclosed in U.S. Pat. No. 4,325,927 teaches production of technical grade monoammonium phosphate directly from the reaction of impure wet-process phosphoric acid and ammonia.

The phosphate source, expressed as phosphorus (P), is used in this invention at levels of from about 0.10 percent, by weight, to about 5 percent, by weight, of the total feed formulation. The most preferred levels of use are from 0.20 percent to 2.0 percent of the total feed formulation, expressed as P.

The reactive metal oxide, hydroxide or reactive salt should be a material which is animal feed approved and which exhibits a particle size of from about 16 mesh, U.S. sieve scale, to about 325 mesh. The most desirable sizing is from 100 mesh, U.S. sieve scale, to 325 mesh.

Of the reactive metal oxides, hydroxides and salts suitable for this invention, magnesium oxide and calcium oxide are most suitable, as they contain a high level of nutrient value, and when manufactured to proper specifications of surface area and sizing, offer a high degree of reactivity.

A suitable high purity magnesium oxide, for purposes of this invention, is the product of reacting magnesium chloride solution, for example seawater or magnesium chloride brine, with lime (CaO) or dolomitic lime (MgO:CaO), to precipitate insoluble magnesium hydroxide which is then calcined to between 1200° F. and 2100° F., usually in a multiple hearth or rotary kiln. This results in a magnesium oxide product with a B.E.T. surface area of between 10 square meters per gram and 120 meters square per gram. Alternatively, magnesium oxide with approximately the same surface area specifications can be produced commercially by calcining natural magnesite ($MgCO_3$).

Calcium oxide is the product of calcination of calcitic limestone ($CaCO_3$). Calcitic limestone can be calcined by various methods. For example; in a shaft kiln, in an indirect gas fired kiln, in a mixed feed kiln, in a parallel flow regeneration kiln, or in a rotary kiln, usually at from about 1600° F. to about 2100° F.

The calcium oxide most useful for this invention would exhibit a B.E.T. surface area from about one square meter per gram to about 2 square meters per gram. The amount of reactive metal oxide, hydroxide or salt which is utilized in the instant invention is from about 0.25 percent to 5 percent, by weight, of the full feed formula expressed as the metal oxide. The most preferred level is from about 0.5 percent to 2.0 percent, by weight, expressed as the metal oxide. The two components of the feed pellet binder system, the reactive phosphate source, and the reactive metal oxide, hydroxide, or reactive salt or combination of metal oxide, hydroxide and reactive salt, are admixed to obtain a uniform blend of materials. The ratio of phosphate, expressed as P, to the metal oxide, hydroxide, or reactive salt, expressed as the metal oxide, can range from about 1:5 to about 5:1. However, the most preferred ratio for this admixed combination is from about 1:3 to about 3:1 P to metal oxide.

The blended ratio of phosphate source and reactive metal oxide, hydroxide or reactive salt, or combination, is then added to the total feed formulation prior to mixing and pelleting.

Alternatively, the desired ratio of phosphate source to metal oxide source, hydroxide or equivalent metal salt, can be admixed separately into the entire feed formulation which is to be pelleted, providing that sufficient mixing is available to completely disperse the metal oxide, hydroxide or metal salt component, or combination, and the phosphate component, completely throughout the feed mixture prior to pelleting.

In the feed pelleting process, various feed ingredients chosen from the list comprising, but not limited to, dehydrated alfalfa, barley, beet pulp, blood meal, brewers grain, buttermilk citrus pulp, coconut meal, corn, corn cob and meal, corn gluten feed, corn gluten meal, corn oil meal, cottonseed meal, distillers grain, distillers solubles, fish meal, hominy, kafir corn, kafir head chop, linseed meal, meat scrap, milo maize, milo head chop, molasses, oats, oat hulls, oat screening, peanut meal, rice bran, rice polishings, soybean meal, wheat, wheat-mids, wheat flour, wheat bran, whey, bone meal, urea, plus others are uniformly mixed. In addition, minerals and mineral supplements and various drug and drug combinations may also be incorporated.

In the practical application and use of this invention, the novel chemically reactive feed binder combination is added to the formulation containing various ground feed ingredients, minerals, vitamins and drug additives. The complete mixture is usually blended in a ribbon mixer or vertical mixer in two or three ton batches. Each batch is then delivered to overhead bins above the pellet mill.

The mixture of feed ingredients, or meal mixture, flows by gravity into a flow rate regulator called a feeder, which provides a constant feed rate to the conditioning chamber. In the conditioning chamber, the entire meal mixture is subjected to steam prior to the actual pelleting step. Most liquids which may be introduced into the formulation, such as molasses added for palatability, are also added through the conditioning chamber. Steam conditioning supplies moisture for lubrication, and partly gelatinizes starches. Steam addition at this point in the process also aids in solubilizing the phosphate component and soluble salt component of this invention, thus increasing the rate of reaction of the binder components. The amount of total moisture which is contained in the feed mixture is normally raised to a level of from about 12 percent to 16 percent, by weight, of the feed formulation, as a result of liquid and steam addition.

The temperature of the mixture is raised by from about 50° F. to 150° F. above ambient temperature as a result of steam addition, which also increases the rate of reaction of the binder ingredients.

Pelleting of the feed is next accomplished by gravity flow of the steam conditioned feed ingredients, now called mash, into the pellet mill die chamber. In the die chamber, usually two or three rollers push the softened mash through holes in a circular die. Typically, the hole diameter of these dies is 9/32 inch to ¼ inch. Knives positioned outside the die cut the densified pellet to proper length. Alternate die types may produce pellets of variable shapes including cubes, squares, and large diameter round pellets.

Typically, the formed pellet temperature ranges from about 150° F. to about 210° F. Hot pellets are usually cooled by forced air through vertical cooling systems to near ambient temperature.

By the use of the binder of this invention, namely the selected phosphate source in combination with at least one of the group consisting of metal oxides, hydroxides, or reactive metal salts, uniformly mixed with the feed prior to the steam conditioning step, a significant increase in pellet durability is attained. In addition, a significant reduction in fines, typically as measured from the pellet cooler after pelleting, is also attained.

Although the entire mechanism of the instant invention is not fully understood, it is believed that the reactive phosphate source, when added at the levels specified above, exothermically reacts with the reactive metal oxide, hydroxide, or reactive salt, or combination thereof, when supplied as directed, to produce a metal phosphate cement-type compound which sets and strengthens the pellet, improves pellet durability, and reduces fines. For example, in the particular instance of the binder being comprised of magnesium oxide and monoammonium phosphate, the resulting cohesive bond is thought to be primarily magnesium ammonium phosphate. As contrasted to previous teachings of block and pellet manufacture, the binder of the present invention is believed to be essentially non-reactive with the components of the feed, and no molasses need be present to obtain solidification or binding of the feed components. While the binder of the present invention is effective with feed compositions containing no molasses, such binders may also be utilized with compositions containing minor amounts of molasses, such as up to about 5 percent.

An additional significant aspect of this novel disclosed invention is the feed nutrient value which is contained in the chosen binder ingredients. Phosphate, for example, is a widely recognized essential element for proper nutrition in a variety of animal feeding programs. Providing phosphate from a source which is both chemically reactive for feed binding purposes and, at the same time, available as a feed nutrient, eliminates the necessity of adding an additional phosphate source for nutrient value only, such as, traditionally, dicalcium phosphate or defluorinated phosphate.

In the same vein, oxides, hydroxides and salts as used in this binder provide such needed minerals as magnesium, sodium, potassium and calcium for nutrition, as well as providing the reactive metal component to assure proper binding ability.

The following illustrative examples are not intended to limit the scope of this invention, but only to show practical application of use.

EXAMPLE I

The following dairy concentrate was prepared by mixing in a horizontal ribbon mixer for three minutes. No pellet binding agent was added.

| Formulation 1. | Percent |
| --- | --- |
| Grain Sorghum | 47.55 |
| Soybean Meal | 22.25 |
| Wheat Bran | 25.00 |
| Limestone | 1.00 |
| Salt | 0.5 |
| Dicalcium Phosphate | 2.7 |
| Vitamin Premix | 1.0 |
| | 100.0 |

The prepared meal was pelleted through a ¼×½ inch pellet die.

Pellets were collected and cooled to ambient temperature. A Pellet Durability Index (PDI) value was determined by tumbling 500 grams of sample for 10 minutes at 50 RPM in a dust tight enclosure.

The testing enclosure consists of an enclosed box 12 inches on a side by 5 inches deep rotated about an axis which is perpendicular to and centered on the 12 inch sides. A 2 inch by 9 inch angle iron is positioned along one of its 9 inch sides to a diagonal of one of the 12 inch by 12 inch sides of the enclosure. A door placed in one of the sides of the enclosure is convenient for introducing and retrieving sample.

To provide additional stress to the pellets being tested, five ⅜ inch size plated steel hex nuts were added to the pellets before tumbling. After tumbling, fines were determined by screening the sample on a wire sieve with openings just smaller than the nominal pellet diameter. The whole pellets remaining were weighed and a durability value calculated as follows:

$$\text{Pellet Durability Index (PDI)} = \frac{\text{wt. of pellets after tumbling} \times 100}{\text{wt. of pellets before tumbling}}$$

A similar formulation was also prepared, substituting phosphoric acid for the phosphate source of Formulation I, and magnesium oxide added to the specification as stated above. Additional limestone was also added to complete the calcium requirement.

| Formulation 2. | Percent |
| --- | --- |
| Grain Sorghum | 45.25 |
| Soybean Meal | 22.25 |
| Wheat Bran | 25.00 |
| Limestone | 2.87 |
| Salt | 0.5 |
| Vitamin Premix | 1.0 |
| Phosphoric Acid | 2.3 |
| Magnesium Oxide | 0.86 |
| | 100.0 |

Both a pellet durability determination and a recycle fines determination were made on each of these formulations as reported below:

| | Pellet Durability Index (PDI) | Percent Recycle Fines |
| --- | --- | --- |
| Formulation 1 | 85.6 | 4.2 |
| Formulation 2 | 93.8 | 3.0 |

PDI values exhibited a 9.6 percent increase in pellet durability for Formulation 2 in which the chemically reactive binder ingredients were used, compared to Formulation 1, in which no binder addition was used. Fines were also reduced by 28.5 percent in Formulation 2 compared to Formulation 1.

EXAMPLE II

Under plant conditions, six tons of each of the following dairy formulations were mixed and pelleted. In Formulation 4, monoammonium phosphate of the specification described above, and magnesium oxide of the specification described above, were substituted for the bentonite clay binder addition of Formulation 3.

| Formulation 3. | Percent |
| --- | --- |
| Corn | 15.68 |
| Peanut Meal | 5.5 |
| Wheat Middlings | 45.0 |
| Gluten Feed | 5.0 |
| Molasses | 5.0 |
| Dry Distillers Grain | 2.5 |
| Bentonite | 2.5 |
| Limestone | 2.5 |
| Barley | 5.0 |
| Soy | 4.62 |
| Calf Manna | 2.5 |
| Magnesium Oxide | 0.25 |
| Magnesium Potassium Sulfate | 1.25 |
| Soda | 1.25 |
| Aurocrumbs | 0.175 |
| Ruminent Premix | 0.5 |
| Mixing Salt | 0.75 |
| Ruminent Trace Mineral | 0.25 |
| | 100.0 |

| Formulation 4. | Percent |
| --- | --- |
| Corn | 15.68 |
| Peanut Meal | 5.5 |
| Wheat Middlings | 46.3 |
| Gluten Feed | 5.0 |
| Molasses | 5.0 |
| Dry Distillers Grain | 2.5 |
| Monoammonium Phosphate | 0.95 |
| Magnesium Oxide | 0.5 |
| Limestone | 2.5 |
| Barley | 5.0 |
| Soy | 4.62 |
| Calf Manna | 2.5 |
| Magnesium Potassium Sulfate | 1.25 |
| Soda | 1.25 |
| Aurocrumbs | 0.175 |
| Ruminent Premix | 0.5 |
| Mixing Salt | 0.75 |
| Ruminent Trace Mineral | 0.25 |
| | 100.0 |

Manufactured pellets were sampled from the cooler for each six ton run and Percent Durability Index values and percent recycle fines from the cooler were determined as outlined in Example I above, except that 10 hexhead ⅜ inch steel nuts were used to supply additional stress to the pellets during tumbling.

| | Percent Durability Index (PDI) | Percent Recycle Fines |
| --- | --- | --- |
| Formulation 3 | 84.2 | 1.92 |
| Formulation 4 | 91.3 | .66 |

PDI values for this comparative example exhibit an increase in pellet durability of 8.4 percent for Formulation 4 with the reactive binder of this invention compared to Formulation 3 with bentonite clay at 2.5 percent as a binder. Recycle fines were reduced by 65.6 percent in Formulation 4, compared to Formulation 3.

EXAMPLE III

Under plant conditions, eight tons of each of the following 20 percent protein high energy dairy formulations were mixed and pelleted. In Formulation 6, monoammonium phosphate of the specification described above, and magnesium oxide also described above, were substituted for a lignin sulfonate based binder additive of Formulation 5, as well as replacing most of the defluorinated phosphate. Additional limestone was also added to balance the calcium.

| Formulation 5. | Percent |
| --- | --- |
| Wheat Middlings | 6.36 |
| Molasses | 3.5 |
| Corn | 46.75 |
| Soybean Meal | 23.25 |
| Defluorinated Phosphate | 2.0 |
| Salt | 0.75 |
| Limestone | 1.75 |
| Magnesium Potassium Sulfate | 0.85 |
| Dairy Flavor | 0.04 |
| Corn Distillers Grain | 2.5 |
| Lignin Sulfonate | 2.0 |
| Peanut Meal | 5.0 |
| Barley | 5.0 |
| Mineral Premix | 0.25 |
| | 100.0 |

| Formulation 6. | Percent |
| --- | --- |
| Wheat Middlings | 7.13 |
| Molasses | 3.5 |
| Corn | 46.75 |
| Soybean Meal | 23.25 |
| Defluorinated Phosphate | 0.61 |
| Salt | 0.75 |
| Limestone Ground | 2.92 |
| Magnesium Potassium Sulfate | 0.85 |
| Dairy Flavor | 0.04 |
| Corn Distillers Grain | 2.5 |
| Magnesium Oxide | 0.5 |
| Monoammonium Phosphate | 0.95 |
| Peanut Meal | 5.0 |
| Barley | 5.0 |
| Mineral Premix | 0.25 |
| | 100.0 |

Manufactured pellets were sampled from the cooler for each eight ton run and Percent Durability Index values and percent recycle fines from the cooler were determined as outlined in Example I above, with ten hexhead ⅜ inch steel nuts used to supply additional stress to the pellets during tumbling.

| | Percent Durability Index (PDI) | Percent Recycle Fines |
| --- | --- | --- |
| Formulation 5 | 73.2 | 2.01 |
| Formulation 6 | 84.1 | 1.02 |

PDI values for this comparative example, using a lignin sulfonate based binder in Formulation 5 compared to a reactive phosphate and magnesium oxide binder of this invention in Formulation 6, exhibit an increase in pellet durability of 14.9 percent for Formulation 6. Additionally, fines were reduced in Formulation 6 by 49.2 percent.

EXAMPLE IV

Under plant conditions, six tons of each of the following 20 percent protein high energy dairy formulations were mixed and pelleted. In Formulation 8, monoammonium phosphate and magnesium oxide were substituted for the binder combination of bentonite clay and Pel-Aid "M" (manufactured by Rhodia Inc.) of Formulation 7. Most of the defluorinated phosphate was also replaced. Additional limestone was added to balance the calcium.

| Formulation 7. | Percent |
| --- | --- |
| Wheat Middlings | 7.46 |
| Molasses | 3.50 |
| Corn | 46.75 |
| Soybean Meal | 23.25 |
| Defluorinated Phosphate | 2.00 |
| Salt | 0.75 |
| Limestone | 1.75 |
| Magnesium Potassium Sulfate | 0.85 |
| Dairy Flavor | 0.04 |
| Corn Distillers Grain | 2.50 |
| Pel-Aid "M" | 0.05 |
| Bentonite Clay | 0.85 |
| Peanut Meal | 5.0 |
| Barley | 5.0 |
| Mineral Premix | 0.25 |
| | 100.0 |

| Formulation 8. | Percent |
| --- | --- |
| Wheat Middlings | 7.13 |
| Molasses | 3.5 |
| Corn | 46.75 |
| Soybean Meal | 23.25 |
| Defluorinated Phosphate | 0.61 |
| Salt | 0.75 |
| Limestone | 2.92 |
| Magnesium Potassium Sulfate | 0.85 |
| Dairy Flavor | 0.04 |
| Corn Distillers Grain | 2.5 |
| Monoammonium Phosphate | 0.5 |
| Magnesium Oxide | 0.95 |
| Peanut Meal | 5.0 |
| Barley | 5.0 |
| Mineral Premix | 0.25 |
| | 100.0 |

Manufactured pellets were sampled from the cooler for each six ton run and Percent Durability Index values and percent recycle fines from the cooler were determined as outlined in Example I above, with ten hexhead ⅜ inch steel nuts used to supply additional stress to the pellets during tumbling.

| | Percent Durability Index (PDI) | Percent Recycle Fines |
| --- | --- | --- |
| Formulation 7 | 73.7 | 2.30 |
| Formulation 8 | 87.5 | 1.31 |

PDI values for this comparative example, using bentonite clay and Pel-Aid "M" as binders in Formulation 7 compared to a reactive phosphate and a reactive magnesium oxide binder in Formulation 8, exhibit an increase in pellet durability of 18.7 percent in Formulation 8. Additionally, fines were reduced in Formulation 8 by 43.0 percent.

EXAMPLE V

Under plant conditions, a minimum of two tons of each of the following 22 percent protein dairy formulations were mixed and pelleted. In Formulation 10, monoammonium phosphate and magnesium oxide as described were substituted for bentonite clay and Benti-Boost (manufactured by Hess & Clark) of Formulation 9. In addition, the monoammonium phosphate replaced all of the defluorinated phosphate of Formulation 9.

Additional limestone was added to Formulation 10 to balance the calcium.

| Formulation 9. | Percent |
| --- | --- |
| Wheat Middlings | 7.5 |
| Soy Meal | 30.6 |
| Potassium Chloride | 1.5 |
| Peanut Meal | 5.0 |
| Limestone | 2.5 |
| Defluorinated Phosphate | 1.5 |
| Ruminent Premix | 1.0 |
| Salt | 1.25 |
| Corn | 32.55 |
| Barley | 10.0 |
| Sodium Bicarbonate | 1.25 |
| Magnesium Potassium Sulfate | 0.25 |
| Bentonite | 2.5 |
| Benti-Boost | 0.1 |
| Molasses | 2.5 |
| | 100.0 |

| Formulation 10. | Percent |
| --- | --- |
| Wheat Middlings | 7.5 |
| Soy Meal | 32.25 |
| Potassium Chloride | 1.5 |
| Peanut Meal | 5.0 |
| Limestone | 3.5 |
| Ruminent Premix | 1.0 |
| Salt | 1.25 |
| Corn | 32.55 |
| Barley | 10.0 |
| Sodium Bicarbonate | 1.25 |
| Magnesium Potassium Sulfate | 0.25 |
| Monoammonium Phosphate | 0.95 |
| Magnesium Oxide | 0.5 |
| Molasses | 2.5 |
| | 100.0 |

Manufactured pellets were sampled from the cooler for each run and Percent Durability Index values and percent fines from the cooler were determined as outlined in Example I above, with ten ⅝ inch plated steel hexnuts used to supply additional stress to the pellets during tumbling.

| | Percent Durability Index (PDI) | Percent Recycle Fines |
| --- | --- | --- |
| Formulation 9 | 81.8 | .74 |
| Formulation 10 | 88.3 | .69 |

PDI values for this comparative example using bentonite clay and Benti-Boost as binders in Formulation 9 compared to a reactive phosphate and reactive mangesium oxide binder of this invention in Formulation 10, exhibit an increase in pellet durability of 7.9 percent in Formulation 10, with fines from the cooler remaining essentially the same for both formulations.

It is understood that the above description of the present invention is susceptible to various modifications, changes and adaptations by those skilled in the art, and that the same are to be considered within the scope of the present invention, which is set forth by the claims which follow.

What is claimed is:

1. A molasses-free pelletized and compressed animal feed composition consisting essentially of a dry mixture of feed ingredients and a binder therefor, said binder consisting essentially of from about 0.1 percent to about 5.0 percent by weight of the total feed formulation of a reactive phosphate source selected from the group consisting of phosphate acid, ammonium polyphosphate, monoammonium phosphate, diammonium phosphate, monopotassium phosphate, dipotassium phosphate, monosodium phosphate, monocalcium phosphate, disodium phosphate, and combinations thereof, and from about 0.25 percent to about 5.0 percent by weight of the total feed formulation of a reactive metal source selected from the group consisting of magnesium oxide, aluminum oxide, potassium oxide, calcium oxide, magnesium calcium oxide, magnesium hydroxide, aluminum hydroxide, potassium hydroxide, calcium hydroxide, calcium sulfate, magnesium potassium sulfate, magnesium sulfate, potassium sulfate, calcium chloride, magnesium chloride, magnesium carbonate, and combinations thereof whereby pellet durability index is increased and percent of recycled fines is reduced.

2. A composition as set forth in claim 1, wherein the reactive phosphate source is present in a concentration of from about 0.2 percent to about 2.0 percent of the total feed formulation, expressed as phosphorous.

3. A composition as set forth in claim 1, wherein an amount of reactive metal oxide, hydroxide, or salt is utilized which is from about 0.5 percent to about 2.0 percent by weight of the total feed formulation, expressed as metal oxide.

4. A composition as set forth in claim 1, wherein the reactive phosphate source is selected from the group consisting of phosphoric acid and monoammonium phosphate.

5. A composition as set forth in claim 4, wherein the reactive metal source is selected from the group consisting of magnesium oxide, calcium oxide, magnesium potassium sulfate, and mixtures thereof.

6. A composition as set forth in claim 5, wherein the ratio of phosphate source to reactive metal source is from about 1:5 to about 5:1.

7. A pelletized and compressed animal feed composition consisting essentially of ground feed ingredients, less that about 5 percent by weight molasses, and a binder, wherein said binder consists essentially of from about 0.10 to 5.0 percent by weight of the total composition of a reactive phosphate source selected from the group consisting of phosphoric acid, ammonium polyphosphate, monoammonium phosphate, diammonium phosphate, monopotassium phosphate, dipotassium phosphate, monosodium phosphate, monocalcium phosphate, disodium phosphate, and combinations thereof, and from about 0.25 to about 5.0 percent by weight of the total composition of a reactive metal source selected from the group consisting of magnesium oxide, aluminum oxide, potassium oxide, calcium oxide, magnesium calcium oxide, magnesium hydroxide, aluminum hydroxide, potassium hydroxide, calcium hydroxide, calcium sulfate, magnesium potassium sulfate, magnesium sulfate, potassium sulfate, calcium chloride, magnesium chloride, magnesium carbonate, and combinations thereof whereby pellet durability index is increased and percent of recycled fines is reduced.

8. An animal feed composition as set forth in claim 7, wherein said binder comprises from about 0.20 to about 2.0 percent by weight of the total composition of phosphoric acid, and from about 0.5 to about 2.0 percent by weight of the total composition of a reactive metal source selected from the group consisting of magnesium oxide, calcium oxide, magnesium potassium sulfate, and mixtures thereof.

9. An animal feed composition as set forth in claim 7, wherein said binder comprises from about 0.20 to about 2.0 percent by weight of the total composition of monoammonium phosphate, and from about 0.5 to about 2.0 percent by weight of the total composition of a reactive metal source selected from the group consisting of magnesium oxide, calcium oxide, magnesium potassium sulfate, and mixtures thereof.

10. An animal feed composition as set forth in claim 7, wherein said composition further comprises minerals, vitamins, drug additives, or a combination thereof.

* * * * *